(12) United States Patent
Lorenz

(10) Patent No.: US 6,924,758 B1
(45) Date of Patent: Aug. 2, 2005

(54) THERMOSTAT WITH RESISTOR-TO-DIGITAL-CONVERTER CONTROL OF TRIP POINT

(75) Inventor: Perry Scott Lorenz, Fort Collins, CO (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/618,490

(22) Filed: Jul. 11, 2003

(51) Int. Cl.[7] .............................................. H03M 1/66
(52) U.S. Cl. ...................................... 341/144; 341/119
(58) Field of Search ................................ 341/144, 118, 341/119, 120, 121, 134, 145, 146, 155; 327/80, 434, 436; 236/78 D, 46 R

(56) References Cited

U.S. PATENT DOCUMENTS 6,377,197 B1 * 4/2002 Rantanen ..................... 341/118
6,612,502 B2 * 9/2003 Poucher ..................... 236/78 D

* cited by examiner

Primary Examiner—Brian Young
(74) Attorney, Agent, or Firm—Merchant & Gould; Timothy P. Sullivan

(57) ABSTRACT

The present invention controls a thermostat trip point using a resistor-to-digital converter. Generally, the value of an external resistor is measured and converted to a digital code equivalent. The digital code drives a DAC (Digital-to-Analog Converter) which sets the trip point for the thermostat. The tolerance of the external resistor(s) does not contribute to the tolerance of the trip point.

18 Claims, 3 Drawing Sheets

THERMOSTAT WITH RESISTOR-TO-DIGITAL-CONVERTER CONTROL OF TRIP POINT

FIELD OF THE INVENTION

The present invention relates to electronic circuits, and more specifically to setting a trip point.

BACKGROUND OF THE INVENTION

Temperature is an often-measured environmental quantity. This might be expected since most physical, electronic, chemical, mechanical and biological systems are affected by temperature. Some processes work well only within a narrow, range of temperatures; certain chemical reactions, biological processes, and even electronic circuits perform best within limited temperature ranges. When these processes need to be optimized, control systems that keep temperature within specified limits are often used. Temperature sensors provide inputs to those control systems.

Many electronic components can be damaged by exposure to high temperatures, and some can be damaged by exposure to low temperatures. Semiconductor devices and LCDs (Liquid Crystal Displays) are examples of commonly used components that can be damage by temperature extremes. When temperature limits are exceeded, action must be taken to protect the system. In these systems, temperature sensing helps enhance reliability. One example of such a system is a personal computer. The computer's motherboard and hard disk drive generate a great deal of heat. The internal fan helps cool the system, but if the fan fails, or if airflow is blocked, system components could be permanently damaged. By sensing the temperature inside the computer's case, high-temperature conditions can be detected and actions can be taken to reduce system temperature, or even shut the system down to avert catastrophe.

Many systems set a temperature trip point that is used to trigger the system that a predetermined temperature has been exceeded. An external resistor is typically used to set the temperature trip point. The external resistor controls the chip's temperature trip point. By selecting the appropriate value of resistor, the customer may set the trip point for the chip.

This solution, however, is not very accurate. Resistor tolerance and the resistor's temperature coefficient add to the trip point tolerance. One problem is that the temperature coefficient is not only one direction but is plus-or-minus some value. Using common and inexpensive resistors, such as 1% resistors with a +/−100 ppM TC (Temperature Coefficient) can contribute up to 70% of the trip point tolerance.

What is needed is a way to tighten the trip point tolerance.

DETAILED DESCRIPTION OF THE PREFERRED EMBODIMENT

Figure 1:
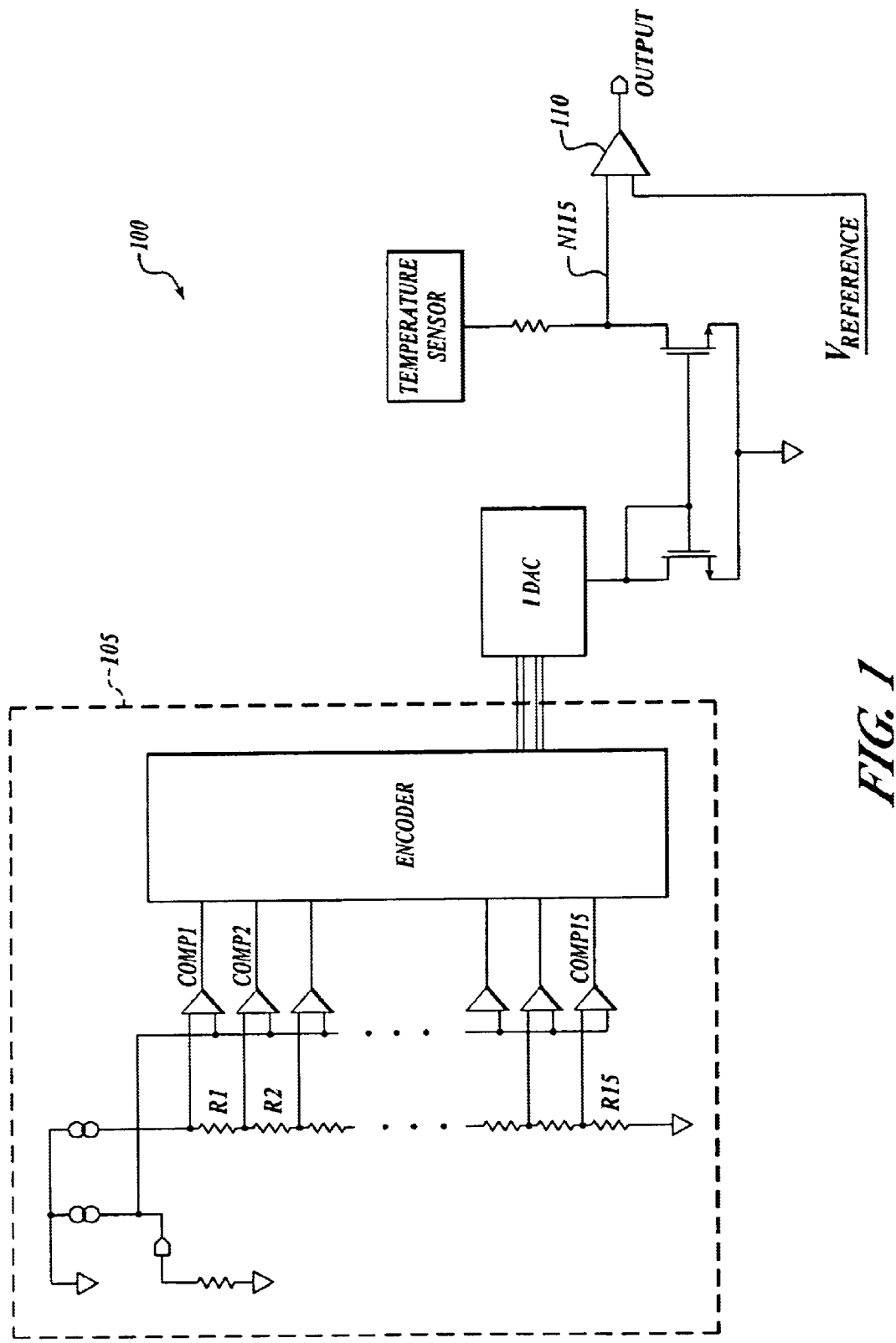
FIG. 1 illustrates a diagram of a resistor-to-digital converter trip point circuit.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on," The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, or data signal. Referring to the drawings, like numbers indicate like parts throughout the views.

The terms "comprising," "including," "containing," "having," and "characterized by," mean an open-ended or inclusive transitional construct and does not exclude additional, unrecited elements, or method steps. For example, a combination that comprises A and B elements, also reads on a combination of A, B, and C elements.

The present invention is directed at controlling at trip point using a resistor-to-digital converter. Generally, the value of an external resistor is measured and converted to a digital code equivalent. The digital code drives a DAC (Digital-to-Analog Converter) which sets the trip point for the thermostat.

FIG. 1 illustrates a diagram of a resistor-to-digital converter trip point circuit; in accordance with aspects of the invention. As illustrated in the figure, trip point circuit 100 includes resistor-to-digital circuit 105, resistor R0, a DAC, transistors M0 and M1, a temperature sensor, and comparator 110. Resistor-to-digital circuit 105 includes resistors R1–R15; corresponding comparators Comp1–Comp15, and an encoder.

The operation of FIG. 1 will now be described. According to the embodiment illustrated, an external resistor is selected to set one of sixteen zones. This is equivalent to using four digital inputs.

A reference current is applied to an external resistor (Rexternal) resulting in a voltage that is compared against a predetermined number of voltages corresponding to a predetermined number of resistors. The number of resistors and comparators are selected based on the desired number of states. According to the embodiment illustrated, the resulting voltage is compared against the fifteen voltages associated with resistors R1–R15 using the fifteen comparators (Comp1–Comp15). The encoder receives the output associated with each comparator and produces a 4 bit digital code.

A user selects the external resistor from a set of specified resistors. According to this particular embodiment, the user may select from fifteen resistors. Specifying the external resistor helps to ensure that each of the external resistors that may be chosen falls into the middle of a corresponding zone associated with the resistor. The zones are configured to be wide enough to accommodate the common and inexpensive 1%, 100 ppM resistors. By using one of the specified resistors, the user effectively chooses one of the zones to set the trip point.

The number of zones may be changed by changing the number of resistors (R1–RN), the number of comparators (Comp1-CompN), and the number of specified external resistors. For example, eight zones may be implemented using 7 resistors, 7 comparators, and 7 specified resistors from which the user selects the zone. This is equivalent to three digital bits.

The value of the selected external resistor is converted to a digital code equivalent using the comparators and an encoder. According to the present embodiment, the encoder is a 16-to-4 encoder. The encoder supplies the digital code to the DAC. The digital code is used to drive the DAC thereby setting the trip point for the thermostat. Comparator 110 compares the signal at node N110 with the reference signal ($V_{REFFERENCE}$) at node N115 to determine if the trip point has been tripped. According to one embodiment, the reference signal ($V_{REFERENCE}$) is set at about 40 mV.

An advantage of the present invention is that the resistors used in the R-to-D Converter do not contribute to the tolerance. All of the resistor's tolerance and temperature coefficient (TC) falls within its assigned zone.

According to one embodiment, a graduated zoning assignment is used. In other words, since a larger value resistor results in a larger voltage variation the zones for the larger resistors are configured to be larger than the zones for the smaller resistors. For example, a 2V reference divided into 16 zones will support a 1% 100 ppM type resistor, thus yielding an R-to-4-bit digital code.

Figure 2:
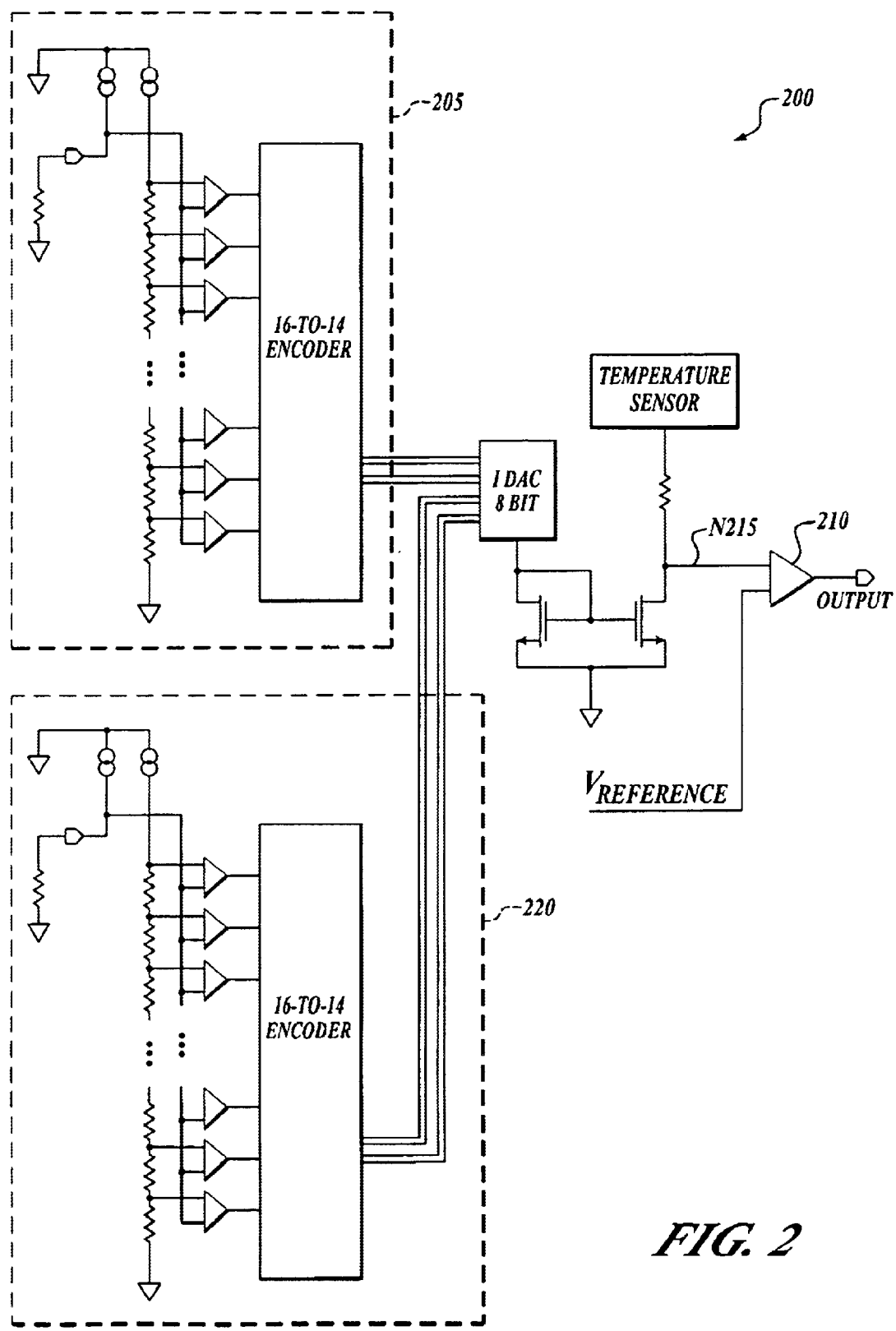
FIG. 2 shows a diagram of a resistor-to-digital converter trip point circuit using two external resistors.

FIG. 2 shows a diagram of a resistor-to-digital converter trip point circuit using two external resistors, in accordance with aspects of the invention. The circuit illustrated in FIG. 2 is similar to the circuit illustrated in FIG. 1; however the circuit in FIG. 2 includes an additional resistor-to-digital circuit (220) comprising an external resistor, an encoder, and comparators and resistors based on the desired number of zones.

The operation of the circuit illustrated in FIG. 2 operates in substantially the same way as the circuit illustrated in FIG. 1. By using a second external resistor 256 trip points may be set using 16 zones. In the present circuit, a current is applied to a second external resistor producing a voltage that is compared against the fifteen voltages associated with resistors R1–R15 using the fifteen comparators (Comp1–Comp15) illustrated within resistor-to-digital circuit 220. The encoder within resistor-to-digital circuit 220 receives the output of each comparator and produces a four bit code which is supplied to the DAC. The four bits from resistor-to-digital circuit 205 and the four bits from resistor-to-digital circuit 220 combine to provide eight bits to the DAC, thereby providing the 256 possible trip points.

This embodiment allows the user to specify any trip point over a full temperature range with the external resistors contributing no tolerance to the trip point accuracy. For example, the temperature range could be from −55° C. to 200° C. with a trip point set at any temperature within the range.

The encoder and DAC illustrated within the embodiments may be combined such that the comparators drive current switches. Additionally, a gray code or thermometer code could be used.

Figure 3:
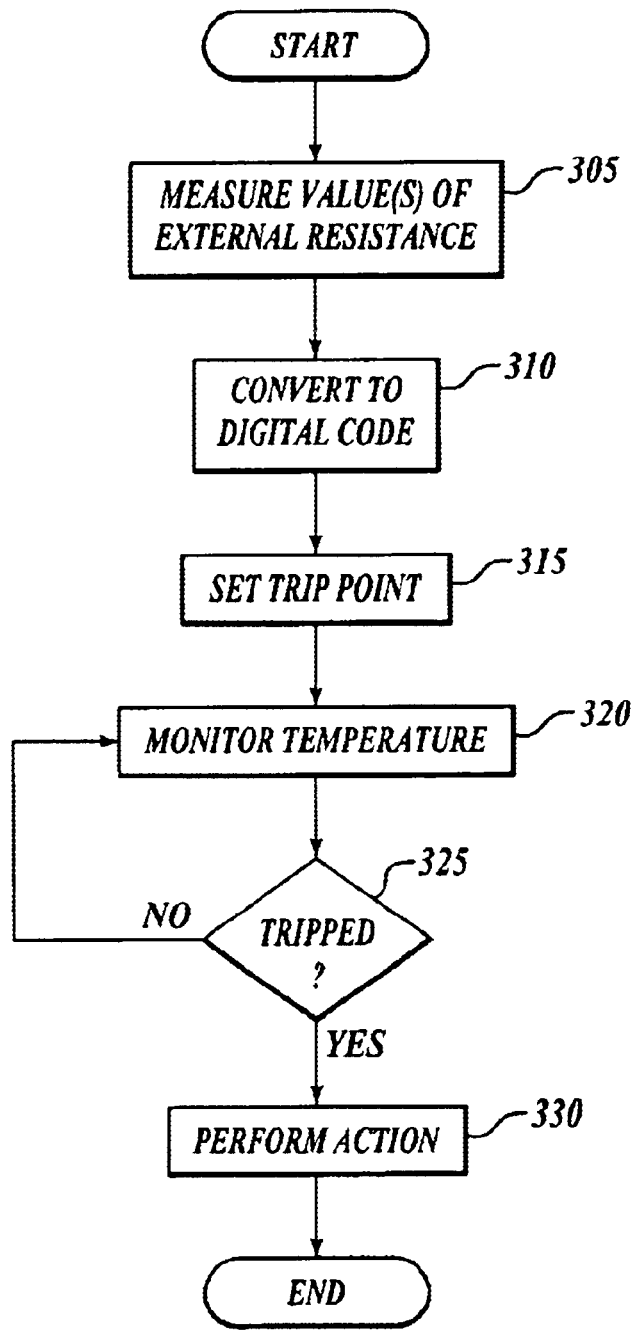
FIG. 3 illustrates a process for setting a trip point, in accordance with aspects of the invention.

FIG. 3 illustrates a process for setting a trip point, in accordance with aspects of the invention.

After a start block, the process moves to block 305, where the external resistance values arc measured. When one external resistor is used, one value is measured. When two external resistors are used, two values will are measured.

Moving to block 310, the value of each external resistor is converted to a digital code. According to one embodiment, the digital code is obtained by comparing the measured external resistance against different zones set by resistors and then encoding the result of the comparisons.

Transitioning to block 315, the trip point is set. According to one embodiment, a DAC is driven by the digital code. Flowing to block 320, the temperature is monitored. Moving to decision block 325, a determination is made as to whether the trip point has been tripped. When tripped, the process flows to block 330 where a predetermined action occurs. The predetermined action may be many different actions. For example, a fan may come on to help cool the circuit, the circuit may be shut down, the circuit may go into a low-power mode, and the like. When the circuit has not tripped, the process returns to block 320. The process then moves to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An apparatus for controlling a trip point that eliminates external resistor tolerance; comprising:
   a resistor-to-digital circuit configured to generate a digital code relating to at external resistor and configured to output a trip signal to a first node relating to the digital code; wherein the resistor-to-digital circuit further comprises a number of resistors and comparators that correspond to a desired number of zones;
   a temperature sensor configured to measure a temperature and output a temperature signal to the first node; and
   a comparator coupled to the firs node and configured to determine when the trip point is tripped.

2. The apparatus of claim 1, wherein the resistor-to-digital circuit further comprises a DAC configured to receive the digital code, and in response, output the trip signal.

3. The apparatus of claim 1, wherein the resistor-to-digital circuit wherein the comparators are configured to drive current switches that are arranged to generate the trip signal.

4. The apparatus of claim 1, wherein the resistor-to-digital circuit further comprises a gray code.

5. The apparatus of claim 1, wherein the resistor-to-digital circuit further comprises a thermometer code.

6. The apparatus of claim 1, wherein the number of resistors and comparators is approximately equal to the number of zones minus one.

7. The apparatus of claim 1, wherein the external resistor is coupled to at least one of a current source and a voltage source and is configured to provide a signal to an input of each of the comparators.

8. The apparatus of claim 7, wherein the number of resistors is coupled to at least one of a current source and a voltage source and is configured to generate signals for each zone, and wherein another input of each of the comparators is coupled to each respective zone.

9. The apparatus of claim 8, further comprising an encoder coupled to the comparators and configured to produce a digital code.

10. The apparatus of claim 1, wherein the external resistor is selected from at least one predefined resistor.

11. The apparatus of claim 10, wherein the at least one predefined resistor comprises a predefined resistor for each of the zones.

12. A method for controlling a trip point associated with a circuit that eliminates external resistor tolerance, comprising:

determining external resistance;

converting the external resistance to a digital code using resistors and comparators associated with a detred number of zones;

setting the trip point;

measuring a temperature associated with the circuit; and determining when the trip point has tripped.

13. The method of claim 12, further comprising performing a predetermined action when the trip point trips.

14. The method of claim 12, wherein converting the external resistance to a digital code further comprises using a DAC and an encoder.

15. The method of claim 12, wherein converting the external resistance to a digital code further comprises using at least one of a gray code and a thermometer code.

16. The method of claim 12, further comprising utilizing a graduated zoning assignment.

17. An apparatus for controlling a trip point for a circuit that eliminates external resistor tolerance, comprising:

means for determining external resistance;

means for converting the external resistance to a digital code using resistors and comparators associated with a desired number of zones;

means for setting the trip point;

means for measuring a temperature associated with the circuit; and means for determining when the trip point has tripped.

18. The apparatus of claim 17, further comprising means for performing a predetermined action when the trip point trips.

* * * * *

UNITED STATES PATENT AND TRADEMARK OFFICE
CERTIFICATE OF CORRECTION

PATENT NO. : 6,924,758 B1
DATED : August 2, 2005
INVENTOR(S) : Lorenz

It is certified that error appears in the above-identified patent and that said Letters Patent is hereby corrected as shown below:

Column 1,
Line 16, "narrow, range" should read -- narrow range --.

Column 2,
Line 22, "on," should read -- "on." --.
Line 64, "(Rextemal)" should read -- (Rexternal) --.

Column 3,
Line 34, "($V_{REFFERENCE}$)" should read -- $V_{REFERENCE}$ --.
Line 36, "40" should read -- 400 --.

Column 4,
Line 20, "arc" should read -- are --.
Line 52, "to at external" should read -- to an external --.
Line 60, "firs" should read -- first --.

Column 5,
Line 33, "detred" should read -- desired --.

Signed and Sealed this

Eighth Day of November, 2005

JON W. DUDAS
*Director of the United States Patent and Trademark Office*